United States Patent
Kamke et al.

(10) Patent No.: US 10,035,317 B2
(45) Date of Patent: Jul. 31, 2018

(54) PROCESS FOR THE PRODUCTION OF WIND POWER INSTALLATION ROTOR BLADES AND FOR THE PRODUCTION OF A MOLD CORE FOR SAME

(71) Applicant: Wobben Properties GmbH, Aurich (DE)

(72) Inventors: Ingo Kamke, Blomberg (DE); Rico Sanftleben, Uplengen (DE)

(73) Assignee: Wobben Properties GmbH, Aurich (DE)

( * ) Notice: Subject to any disclaimer, the term of this patent is extended or adjusted under 35 U.S.C. 154(b) by 370 days.

(21) Appl. No.: 14/428,585

(22) PCT Filed: Jul. 25, 2013

(86) PCT No.: PCT/EP2013/065689
§ 371 (c)(1),
(2) Date: Mar. 16, 2015

(87) PCT Pub. No.: WO2014/044445
PCT Pub. Date: Mar. 27, 2014

(65) Prior Publication Data
US 2015/0231844 A1    Aug. 20, 2015

(30) Foreign Application Priority Data
Sep. 19, 2012   (DE) .................. 10 2012 216 830

(51) Int. Cl.
*B29D 99/00*   (2010.01)
*B29C 45/14*   (2006.01)
*B29L 31/08*   (2006.01)

(52) U.S. Cl.
CPC .... *B29D 99/0025* (2013.01); *B29C 45/14008* (2013.01); *B29C 45/14836* (2013.01); *B29L 2031/08* (2013.01)

(58) Field of Classification Search
CPC ............ B29D 99/0025; B29D 99/0028; B29L 2031/08; Y02E 10/721; B29C 70/443;
(Continued)

(56) References Cited

U.S. PATENT DOCUMENTS 3,008,859 A    11/1961   Smack
4,492,732 A *   1/1985   Murphy ................ B29C 70/603
                                                    428/404
(Continued)

FOREIGN PATENT DOCUMENTS

DE           602 107 29 T2     4/2007
DE      10 2006 031 325 A1     1/2008
(Continued)

*Primary Examiner* — Xiao S Zhao
(74) *Attorney, Agent, or Firm* — Seed Intellectual Property Law Group LLP

(57) ABSTRACT

The invention concerns a process for the production of a mold core for the one-part production of wind power installation rotor blades. According to the invention the method includes the steps: providing a flexible hollow body, for example a film tube, inserting the hollow body between at least two mold portions which are so arranged relative to each other that they form a negative shape of the rotor blade to be produced, filling the hollow body with loose material prior to or after insertion of the hollow body between the mold portions, and producing a reduced pressure in the hollow body after it has been filled and inserted in such a way that the hollow body solidifies. The invention further concerns a process for producing a reduced pressure between mold portions and mold core.

22 Claims, 6 Drawing Sheets

(58) Field of Classification Search
CPC ... B29C 70/446; B29C 33/3821; B29C 33/54; B29C 45/14008
See application file for complete search history.

(56) References Cited

U.S. PATENT DOCUMENTS

| | | |
|---|---|---|
| 5,518,385 A | 5/1996 | Graff |
| 2003/0116262 A1 | 6/2003 | Stiesdal et al. |
| 2007/0057413 A1 | 3/2007 | Haney |
| 2007/0253827 A1* | 11/2007 | Dahl ............... B64D 45/02 416/230 |
| 2009/0087599 A1 | 4/2009 | Cheng et al. |
| 2009/0166935 A1 | 7/2009 | Jacob et al. |
| 2009/0309268 A1 | 12/2009 | Cavaliere et al. |
| 2012/0067515 A1 | 3/2012 | Dahl et al. |
| 2012/0114909 A1* | 5/2012 | Leombruno ......... B29C 33/10 428/172 |
| 2013/0039775 A1 | 2/2013 | Muschke et al. |

FOREIGN PATENT DOCUMENTS

| | | |
|---|---|---|
| DE | 10 2011 003 378 A1 | 8/2012 |
| EP | 1 310 351 A1 | 5/2003 |
| JP | 5949931 A | 3/1984 |
| JP | 8142060 A | 6/1996 |
| SU | 603482 A1 | 3/1978 |
| TW | 200914252 A | 4/2009 |
| WO | 95/14563 A1 | 6/1995 |
| WO | 00/01520 A1 | 1/2000 |
| WO | 2009/112017 A2 | 9/2009 |

* cited by examiner

PROCESS FOR THE PRODUCTION OF WIND POWER INSTALLATION ROTOR BLADES AND FOR THE PRODUCTION OF A MOLD CORE FOR SAME

BACKGROUND

Technical Field

The present invention concerns a process for the production of a mold core for the one-part production of wind power installation rotor blades, and for the production of a mold core for same.

Description of the Related Art

Wind power installation rotor blades are components which in operation of the installation are heavily loaded, and in respect of which good structural integrity is already an important consideration for that reason. In that respect it has been found in the course of the years that, particularly with rotor blades assembled from a plurality of components, it is possible to see in the region of the joint locations potential structural weak points which can require increased maintenance and repair effort.

Blade molds and also production processes are admittedly known, which already permit a generally satisfactory and reliable structure to be afforded for rotor blades. Nonetheless there is a need to minimize the number of necessary join locations in order to reduce the risks of defects in rotor blades for wind power installations.

A known approach in that respect is one-piece production of wind power installation rotor blades. In that case a mold core and a plurality of mold portions are provided, wherein the mold portions in the assembled mold form a negative model of the rotor blade to be produced. Provided between the mold portions and the mold core is a volume which is filled with the material of the rotor blade, that is essential for the structure. Particularly preferably composite materials are used in that case, for example GFR or CFR materials.

While the external shape of the rotor blade is predetermined by the mold portions themselves the mold core is responsible for defining the internal shape of the rotor blade and at the same time ensuring that the materials which are arranged in layers in the volume between the mold portions and the mold core fit snugly and exactly to the external shape predetermined by the mold portions.

A process for the one-piece production of a wind power installation rotor blade is known for example from T2. The process described there describes the use of a fixed mold core surrounded by an elastic outer layer. By compression of the elastic outer layer in conjunction with the hard core, when the mold portions are assembled the fiber layers are pressed against the mold portions.

The known process suffers from a number of disadvantages. On the one hand the provision of a fixed mold core requires it to be produced with a high degree of precision. That necessitates a high level of manufacturing expenditure for the mold core. In addition, because of the elastic external region of the mold core, there is the danger that, when the mold portions are pressed together, distortion or waviness occurs in the fiber material layers between the mold core and the mold portion, and that overall endangers the structural integrity of the rotor blade. Furthermore the geometry of the rotor blade is limited to comparatively simple geometrical shapes by virtue of the fixed mold core and the production complication and expenditure required for same. A mold core of the kind described in DE 602 107 29 T2 cannot be manufactured with satisfactory quality for aerodynamically optimized rotor blades which possibly have interleaved portions and undercut configurations. Furthermore rigid molded bodies cannot be removed from such rotor blades or can be removed therefrom only with very great difficulty as the rotor blades are joined and hardened in one piece.

BRIEF SUMMARY

One or more embodiments of the present invention are directed a mold core which may overcome the disadvantages encountered in the state of the art. One embodiment of the invention is directed to a process of the kind set forth in the opening part of this specification with the steps:

providing a flexible hollow body, for example a film tube, inserting the hollow body between at least two mold portions which are so arranged relative to each other that they form a negative shape of the rotor blade to be produced, filling the hollow body with loose material prior to or after insertion of the hollow body between the mold portions, and producing a reduced pressure in the hollow body after it has been filled and inserted in such a way that the hollow body solidifies.

In that respect one embodiment of the invention makes use of the realization that the hollow body retains the shape predetermined by the mold portions after application of the reduced pressure. The ambient pressure acting on the hollow body which is subjected to reduced pressure ensures that. At the same time completely filling the hollow body with loose bulk material ensures that, when the reduced pressure is applied, the molded body then suffers only a negligible loss in volume, if any at all. That is guaranteed in particular by virtue of the fact that the hollow body is completely filled with loose material and the loose material itself is pressure-stable. The loose material already displaces a large part of the air out of the hollow body, in the step of filling it with loose material, and the air that still remains can be sucked out of the completely filled hollow body, in which case the loose material particles which bear against each other maintain the shape predetermined by the mold portion. A particular advantage of the process according to one or more embodiments of the invention is also seen in the fact that, subsequently to its use in a process for the production of wind power installation rotor blades even of the most complicated rotor blade geometries, the hollow body can be easily removed. To do that, it is only necessary to eliminate the reduced pressure in the hollow body by opening it, thereby to ventilate it and to let out a partial amount of loose material, so that the hollow body can be pulled out of the interior of the mold portions or the interior of the rotor blade.

An advantageous development of one embodiment of the invention provides that prior to the insertion step the hollow body is partially filled with loose material, preferably to 20% to 70%. Because the hollow body is already partially filled before insertion or introduction of the hollow body between the mold portions it can be better positioned within the mold portions. At the same time however because it is only partially filled it is still movable in such a way that it can be well re-positioned and shaped. Complete filling of the hollow body is then effected after it has been positioned between the mold portions.

In a preferred embodiment the process includes the step of producing a short-term increased pressure in the hollow body which has been filled with loose material and inserted between the mold portions. In this connection the expression short-term is used to mean a period of time of 5 minutes or less. Depending on the flow characteristics of the loose material, a period in the double-digit seconds range or below may also be adequate. That process step achieves a further significant improvement in filling of the hollow body. It has been found that from time to time, when filling the hollow body between the mold portions, in particular in the region of undercut configurations, the hollow body does not bear snugly in one hundred percent relationship against the contour which is predetermined by the mold portions. By applying an increased pressure to the interior of the hollow body for a short period of time, it is so-to-speak blown up, whereby the wall of the hollow body bears snugly and exactly against the surrounding mold portions and the loose material which is already in the hollow body moves as in a settling process into the spaces which are now additionally produced.

After the step of producing the increased pressure an advantageous development of the process provides that bulk material is post-filled into the hollow body. As a result the space in the hollow body, which has been freed by the settlement process, is again filled with loose material. That makes it possible to make optimum utilization of the volume between the mold portions.

In a further preferred embodiment the process further includes the step: inclining the hollow body which has preferably already been inserted between the mold portions into an angled position relative to the horizontal, preferably in a range of 5° to 60°. It has been found that inclining the mold portions and the hollow body disposed therein in the filling operation, and preferably also when subjecting the hollow body to increased pressure, that advantageously promotes the further movement of the loose material into the spaces and settlement of the loose material. The greater the tendency to cohesion between the individual particles of the loose material, and the correspondingly greater that the particles of the loose material come into hooking engagement with each other, the correspondingly greater is the selected angle of inclination according to one embodiment of the invention. In addition in that case the force of gravity of the loose material has a promotional effect.

In a further preferred embodiment the process further includes the step: shaking of the hollow body, preferably when the hollow body has already been inserted between the mold portions, in the position of being angled relative to the horizontal. In this respect the term shaking is used to mean abrupt jerky movements of the hollow body in various directions in such a way that vibrations penetrate into the interior of the hollow body. That still further improves and enhances the movement of the loose material into the spaces and settlement thereof.

Further preferably for filling the hollow body, a filling connection is provided and used, which is spaced vertically from a filling opening of the hollow body in such a way that the loose material is moved into the hollow body under the action of the force of gravity. The filling connection is preferably adapted to be movable in respect of height and is adjusted to follow the hollow body when it is inclined so that the vertical spacing is also present in relation to the hollow body when in the inclined position.

In a further advantageous development of the process according to an embodiment of the invention the mold core is a multi-part mold core, wherein each of said parts is produced with the steps:

inserting the hollow body between mold portions which are so arranged relative to each other that they form a negative shape, filling the hollow body with loose material prior to or after insertion of the hollow body between the mold portions, and producing a reduced pressure in the hollow body after it has been filled and inserted, wherein the hollow body solidifies in a positive shape corresponding to the negative shape.

As from a given size wind power installation rotor blades are preferably additionally stiffened with legs extending internally between the walls of the rotor blade. The legs are preferably additionally already embedded as mold portions in production of the mold core, between the mold portions. Of the multi-part mold core, a respective part extends between the mold portions forming the outside wall of the rotor blade and the legs. Each of the parts of the multi-part hollow body is preferably designed for the one-part hollow body in accordance with one of the above-described preferred embodiments, wherein in particular for each of the parts:

the respective hollow body is partially filled with loose material prior to the insertion step, preferably to 20% to 70%, and after the insertion step it is completely filled with loose material, and one, more or all of the steps are performed for each of said parts, producing a short-term increased pressure in the hollow body filled with loose material and inserted between the mold portions, post-filling loose material after the step of producing increased pressure, and/or inclining the hollow body which has preferably already been inserted between the mold portions into an angled position relative to the horizontal, preferably in a range of 5° to 90°, and/or shaking the hollow body, preferably when already inserted between the mold portions, in the position of being angled relative to the horizontal.

Preferably, for each of the parts, the filling operation is effected by means of the filling connection which is increased in height, or by means of a respective separate filling connection.

With the process according to one or more embodiments of the invention, it is preferable if the loose material used is a preferably cohesion-less loose material comprising in particular spherical particles. In this respect the term cohesion-less piece material is used to mean that the material has an unhindered flow characteristic and individual material particles do not impede the flow behavior by adhering to other particles. In that respect adhesion processes as a consequence of electrostatic charging of the particles, which is sometimes caused by friction during the flow, can be disregarded. The particles of the loose material are preferably of a spherical or polyhedral configuration. Spherical particles and polyhedrons with six or more surfaces generally afford a particularly good flow characteristic.

The particles of the loose material are preferably in the form of plastic bodies, preferably of a polymer material. Most materials of the group of polymers can be involved, the material preferably being selected from the group consisting of polyurethane, polyethylene, polypropylene, polyvinylchloride, polyester, and (expanded) polystyrene. The material of the loose material is particularly preferably made from a biologically degradable polyester. If the intention is that the mold core produced with the process according to an embodiment of the invention is also to be left between the mold portions during hardening of the rotor blade material of the loose material preferably has adequate temperature resistance. That is the case in particular as long as the glass transition temperature is greater than 80° C., preferably greater than 150° C. Because of the applied reduced pressure in the interior of the hollow body the particles of the loose material are however held in shape in stabilized fashion even if they do not withstand the temperatures during hardening. In this respect the glass transition temperature is understood as being that which has been determined by means of dynamic differential scanning calorimetry (DSC) in accordance with DIN EN ISO 11357.

Preferably the mean diameter of the particles is 20 mm or less, particularly preferably 1.5 mm to 6 mm. With those small diameters, the material is caused to bear particularly snugly against the predetermined contour and at the same time the particle size is still sufficient to ensure good handling of the loose material with a good flow characteristic during the filling operation.

The invention further concerns in one embodiment a process for the one-piece production of a wind power installation rotor blade including the steps:
  providing a mold core produced by a process according to one of the above-described preferred embodiments of the invention, or
  producing a mold core by a process according to one of the above-described preferred embodiments of the invention,
  providing at least a first mold portion and a second mold portion which together form a negative shape of the rotor blade,
  covering the mold core or the mold portions with one or more fiber material layers,
  assembling the mold portions and the mold core,
  pressure-tightly closing the assembly consisting of the mold core and mold portions,
  producing a reduced pressure between the mold portions and the mold core, and
  feeding injection material between the mold portions and the mold core under a reduced pressure, and
  hardening the injection material after it has impregnated the fiber material.

The above-mentioned process for the one-piece production of a wind power installation rotor blade makes full use of the advantages afforded by the process for the production of the mold core, for which reason attention is directed in that respect to the foregoing description. In particular the advantage of easier removability is reflected in the process for the one-piece production of the wind power installation rotor blade.

While the above-described process represents a vacuum injection process, it is also found that the advantages of the process according to an embodiment of the invention for the production of a mold core deploy their action also in relation to a process, which instead of feeding injection material between the mold portions and the mold core provides for the use of so-called prepregs which are placed in an already impregnated condition around the mold core or in the mold portions respectively, and hardened, without injection material also having to be supplied by means of reduced pressure implementation.

A development of the process according to one embodiment of the invention for the production of a wind power installation rotor blade comprises the step:
  covering the mold core or the mold portions with one, more or all of the following:
    a transfer film, preferably as the outermost layer,
    a vacuum film, preferably as the innermost layer,
    one or more first fluid lines for subjecting the volume between the mold core or cores and the mold portions with reduced pressure,
    one or more second fluid lines for feeding injection material into the volume between the mold core or cores and the mold portions with reduced pressure,
    one or more spar caps, and
    one or more further mold portions which for example are in the form of a leg or a pressure balancing chamber, wherein the mold portion or portions and the spar caps are respectively impregnated with injection material or are impregnated during the step of feeding injection material between the mold portions and the mold core or cores under a reduced pressure.

The transfer film serves to be able to separate the hardened structure more easily from the mold portions used. A vacuum film as the innermost layer between the mold core and the fiber material layer is to be provided in particular if the hollow body itself is not vacuum-tight. It has to be superposed with a vacuum film so that it can retain its shape after having been subjected to the reduced pressure. Optionally, in addition to the hollow body consisting of pressure-tight material, it is also possible to provide vacuum films.

In a configuration of the process, that is particularly economic in terms of manufacture, firstly at least the first mold portion is covered, in which respect it is also possible for both mold portions to be covered at the same time, before subsequently the mold core or cores are placed in the first mold portion. After insertion the mold core or cores and the first mold portion are fixed relative to each other, for example by means of an additional vacuum film. In the fixed condition they are then assembled to the second mold portion when the second mold portion has been covered. Preferably that is effected either in accordance with a first alternative by lifting and turning ('reversing') the assembly consisting of the first mold portion and mold core or cores, with subsequent downward movement on to the second mold portion, or in accordance with a second alternative by lifting and turning the covering or the cover fabric assembly of the second mold portion, either in conjunction with the second mold portion or separately, with subsequent separate lifting and turning of the second mold portion. In the case of the procedure in accordance with the second alternative the arrangement of first mold portion and mold core can optionally be fixed by means of vacuum film. The arrangement of the second mold portion and the fabric assembly is optionally also fixed with vacuum film if lifting and turning is to be effected in a composite condition. If now the covering or the fabric assembly of the second mold portion is to be lifted and turned without the mold portion before the second mold portion is set in place the covering or fabric assembly is optionally fixed by means of vacuum film.

The approach of introducing a plurality of portions into the respective films and then fixing them relative to each other by means of vacuum film when the mold portions are still in the open condition is based on the realization that the various necessary layers for the rotor blade and rotor blade production can be introduced with the greatest degree of dimensional accuracy if the mold portions are presented in a condition of being open upwardly.

Particularly preferably, in the process according to one embodiment of the invention for the production of a wind power installation rotor blade after the feed of injection material, a part of the loose material is removed from the mold core. That can be effected prior to or after the hardening step. An advantage of removing loose material from the hollow body is that this makes it easier to remove the mold core.

In a particularly preferred embodiment of this invention the prepared assembly of mold portions, mold core or cores, fiber material and film material is equipped with supply connections which on the one hand allow the production of a reduced pressure in the space between mold core and mold portions, and on the other hand permit the feed of injection material. It is particularly preferable in that respect if the connections for one or more fluid lines and for the feed of injection material are so placed that a reduced pressure produced by means of the fluid lines in the space between mold portions and mold core provides that the injection material firstly impregnates the leg or legs which support the mold portions relative to each other. In particular in that case the connection or connections for the injection material feed is or are so arranged that the injection material which is drawn by means of the reduced pressure out of the fluid lines into the intermediate space between mold core and mold portions firstly encounters the leg or legs. The injection material then has to flow firstly completely through the leg, with the reduced pressure being maintained, before it can transfer into the outer fiber layers at the junction between the leg and the outer fiber layers. That enhances the reliability in terms of achieving complete impregnation of the entire structure. In known processes there is the danger that, with excessively fast impregnation and flow of the injection material along the outer fiber material layers, which correspond to the peripheral surface of the rotor blade to be produced, the injection material does not penetrate entirely into the leg. That endangers the structural integrity of the rotor blade.

The invention in its preferred embodiment avoids that problem.

In accordance with a second aspect the invention concerns a process for producing a reduced pressure between mold portions and mold core. The process in this aspect is preferably used to apply a reduced pressure to the space between mold core and mold portion in the above-described process.

Known processes for the production of a reduced pressure between mold portions and mold core are essentially based on producing a reduced pressure in the fluid lines or at least one fluid line after connection of the fluid lines to the connections provided for same, and checking that by means of a manometer. As soon as the reduced pressure is sufficiently great the apparatus is pressure-tightly closed whereby the reduced pressure is to be kept constant.

Subsequently the feed of injection material into the space between mold core and mold portions is then enabled and the injection material spreads out. If, due to the production involved (or because of other circumstances), leaks occur in the fluid system, it has been necessary with known processes to manually initiate countermeasures in order to stop the loss of pressure and to subsequently evacuate the system again. That requires a high level of personnel and financial involvement.

Accordingly the process in accordance with the second aspect of the invention is to provide a process enjoying increased operational reliability and efficiency.

In embodiment there is provided a process of the above-indicated kind, with the steps:

setting a pressure reference value, preferably by means of an operating unit of an electronic control unit which is preferably a programmable logic controller (PLC), setting a reference time for which the pressure reference value is to be maintained, communicating the pressure reference value and the reference time to the electronic control unit, detecting a pressure value in a fluid line in fluid communication with the space between mold portions and mold core, preferably by means of at least one pressure sensor, communicating the pressure value to the electronic control unit, ascertaining a difference between the pressure reference value and the pressure value by means of the electronic control unit, venting the fluid line until the difference is equal to zero whereby a reduced pressure is applied, maintaining the reduced pressure during the duration of the set reference time or until an automatic or manually implemented termination, and ventilating the fluid line until ambient pressure prevails there. The invention in accordance with this aspect makes use of the realization that automated control or regulation and at the same time continuous monitoring of the process performance can be ensured by monitoring the reduced pressure in the corresponding fluid line and by specifically targeted control interventions in one or more valves arranged in the fluid line between the space between the mold core and the mold portions and a vacuum pump. Co-ordination of pressure value monitoring on the one hand and the necessary control and regulating interventions in the valves on the other hand is ensured according to one embodiment of the invention by an electronic control unit which is preferably in the form of a programmable logic controller (PLC). The particular advantage of such a PLC is that control and programming is possible directly by means of firmware in the PLC by way of connected operating devices and display elements. In that way it is possible to provide a complex sequence of working procedures, at a low level of complication and expenditure in terms of program technology. Preferably the pressure sensor or sensors associated with the fluid line are connected to an input of the PLC for data transmission. The one or more valves to be controlled or regulated is further preferably connected to an output of the PLC for data transmission. The PLC itself is preferably adapted to protocol the pressure values detected by the pressure sensor or sensors and to compare them by comparison with previously stored or deposited reference values. Further preferably the control unit is adapted to also process the detected signals. In addition the control unit in accordance with an embodiment of the invention is adapted to implement the control or regulating tasks attributed to it for a predetermined time which can also preferably be inputted by means of the operating unit. In accordance with an embodiment of the invention it is possible in that way to predetermine a standard procedure for drawing injection material into the structure of a rotor blade by means of vacuum, crucially determined by the reduced pressure to be applied and the time for which the reduced pressure is to be maintained. Particularly advantageously the control device is also adapted to set different reduced pressure stages in the fluid line, along a predetermined period of time. It is thus possible for example to produce a greater or lesser pressure drop at the beginning of the operation of producing the reduced pressure.

In accordance with a preferred embodiment of the process in the second aspect during the course of the reference time after the pressure reference value is reached the applied reduced pressure is post-regulated by means of the following steps:

ventilating the space between mold core and mold portion if the difference ascertained by the electronic control unit is greater than zero, and venting the space between mold core and mold portion if the difference ascertained by the electronic control unit is less than zero. If the difference is greater than 0, this means that the pressure in the rotor blade structure, that is to say in the space between mold core and mold portions, is lower than the pressure reference value. A difference of less than 0 means that the pressure in the space between mold core and mold portions is greater than the pressure reference value, which means that re-regulation has to be effected.

Preferably, for post-regulation of the applied reduced pressure in the fluid line air is conveyed through a first valve, preferably a regulating valve, which can be opened and closed by means of the electronic control device in dependence on the difference.

Further preferably for accelerated venting and/or for accelerated ventilation of the fluid line air is conveyed through a bypass, wherein the bypass can be opened and closed by means of a second valve actuated by the electronic control device. For that purpose the second valve preferably has a greater nominal width than the first valve because they can be conveyed with a markedly higher mass flow in the steps of accelerated ventilation and venting to ambient pressure or from ambient pressure.

Further preferably the process according to one embodiment of the invention includes the step:

protocolling of the pressure values ascertained preferably by the at least one pressure sensor during the duration of the set reference time.

In a further development of the process according to one embodiment of the invention it comprises one, more or all of the steps:

terminating the reduced pressure implementation and ventilation of the fluid line to ambient pressure as soon as the protocolled pressure values differ from the pressure reference value by more than a preset tolerance value, terminating the reduced pressure implementation and ventilation of the fluid line to ambient pressure as soon as the protocolled pressure values increase at a rise rate higher than a preset maximum rise rate, and/or producing a pressure variation diagram for the duration of the set reference time or the duration of reduced pressure implementation until termination thereof. Particularly preferably it is thus possible, in a situation involving inactive post-regulation, by the electronic control device, to protocol the pressure variation in respect of time in the fluid line connected to the space between mold core and mold portions. That makes it possible in particular to check sealing integrity. If the pressure loss along a predetermined time interval is above a predetermined limit value, that gives a reliable indication that there is an unacceptably high leakage situation in the system, and there is a high degree of probability that this results in inadequate filling with injection material. Based on a fault protocol produced in that way, further maintenance measures can be initiated. Analysis of the pressure variation diagram produced also makes it possible to check further influencing factors, for example disturbances in the installation (this is preferably in combined consideration with further variation diagrams in respect of other measurement parameters, for example the voltage supply, or operating parameters, for example of the vacuum pump, etc.).

BRIEF DESCRIPTION OF THE SEVERAL VIEWS OF THE DRAWINGS

The invention is described in greater detail hereinafter by means of a preferred embodiment by way of example and with reference to the accompanying Figures in which.

If identical or structurally similar features are contained in the Figures, they are, where appropriate, denoted by the same references.

DETAILED DESCRIPTION

Figure 1:
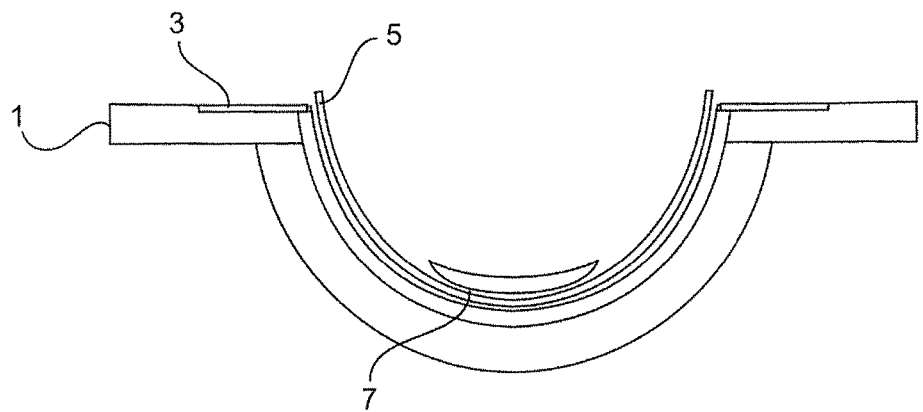
FIGS. 1 to 9 show various stages in the process for the production of a mold core and the process for the production of a wind power installation rotor blade.

FIG. 1 shows the covering operation on a first mold portion 1. A transfer film 3, a fiber material layer 5 and a spar cap 7 are introduced into the mold portion 1 which diagrammatically illustrates a first mold half for the wind power installation rotor blade.

Figure 2:
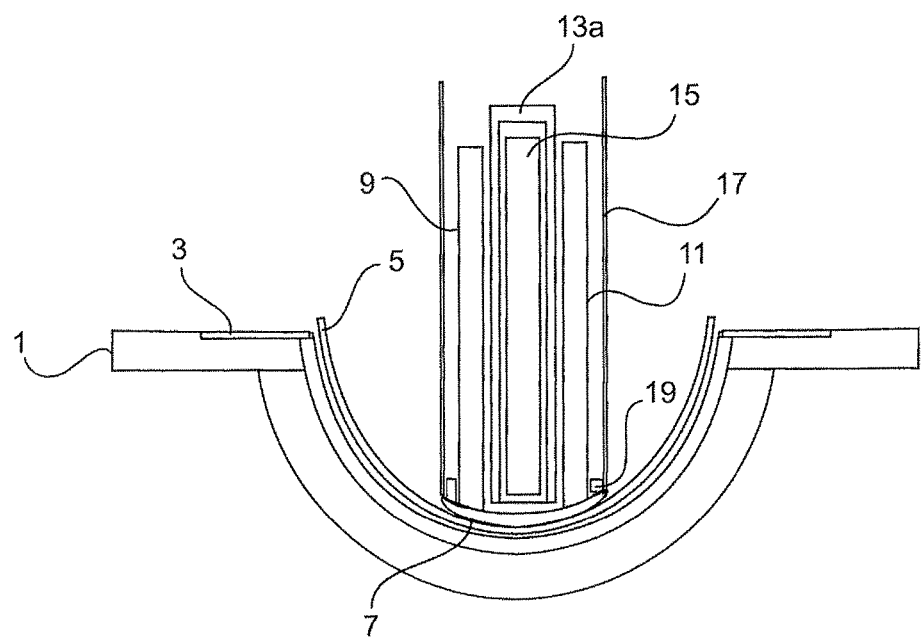

As can be seen from FIG. 2 a first leg 9 and a second leg 11 are provided following the covering operation as shown in FIG. 1 in accordance with a preferred embodiment. The first leg 9 and the second leg 11 are arranged in the mold portion 1 terminating flush with the spar cap 7. In alternative configurations it is provided that only one leg, no leg at all or more than two legs, are used. A hollow body 13*a* is introduced between the first and second legs 9, 11. The hollow body 13*a* is partially filled with loose bulk material 15. The hollow body 13*a* comprises a pressure-tight material, for example tubular vacuum film.

A respective layer of vacuum film 17 is applied to the legs 9, 11 on the side remote from the internal hollow body 13*a*, the vacuum film 17 being sealed off against the legs by means of a respective seal 19.

Figure 3:
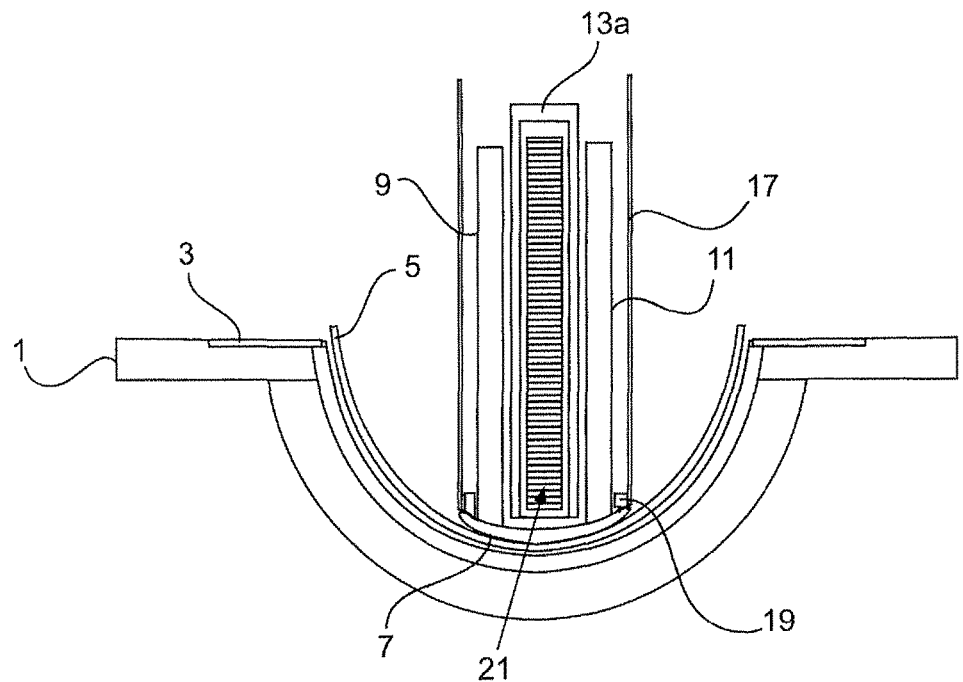

In an alternative embodiment shown in FIG. 3 a tubular body can be used additionally or alternatively to the loose material, a three-dimensional spacer fabric (DSB) 21 being provided in the interior of the tub.

Figure 4:
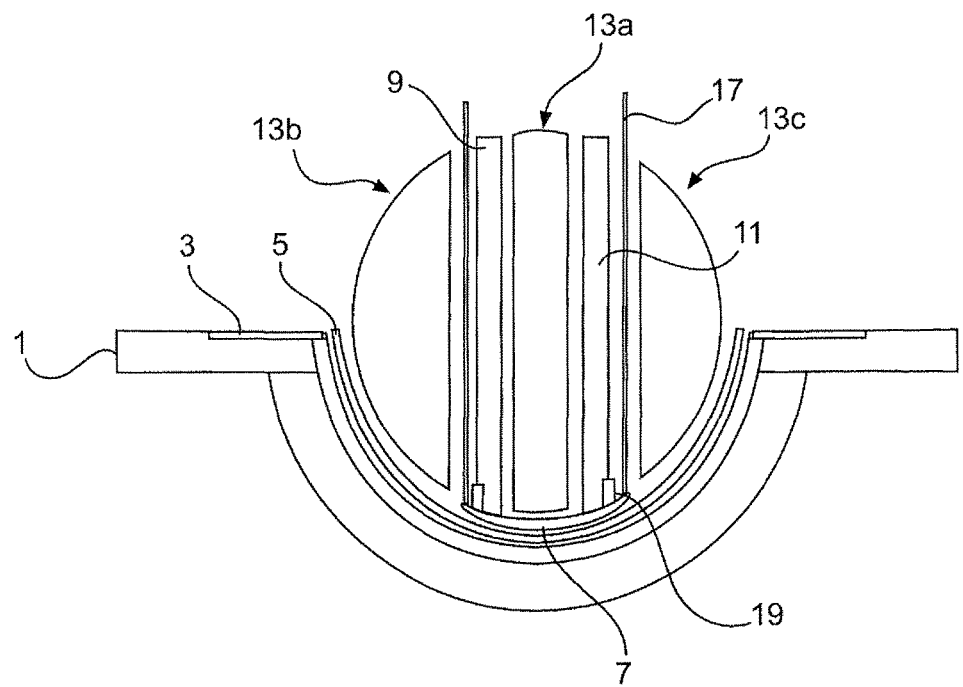

As can be seen from FIG. 4 the free spaces between the mold portions 9, 11 to the left-hand and right-hand sides are respectively covered with a further portion of the mold core to be produced, namely a second hollow body 13*b* and a third hollow body 13*c* which together with the hollow body 13*a* then later form a three-part mold core. The second and third hollow bodies 13*b, c* are partially filled with loose material exactly like the first hollow body 13*a*. The loose material is preferably introduced into the hollow bodies 13*a, b, c* by being blown thereinto.

Figure 5:
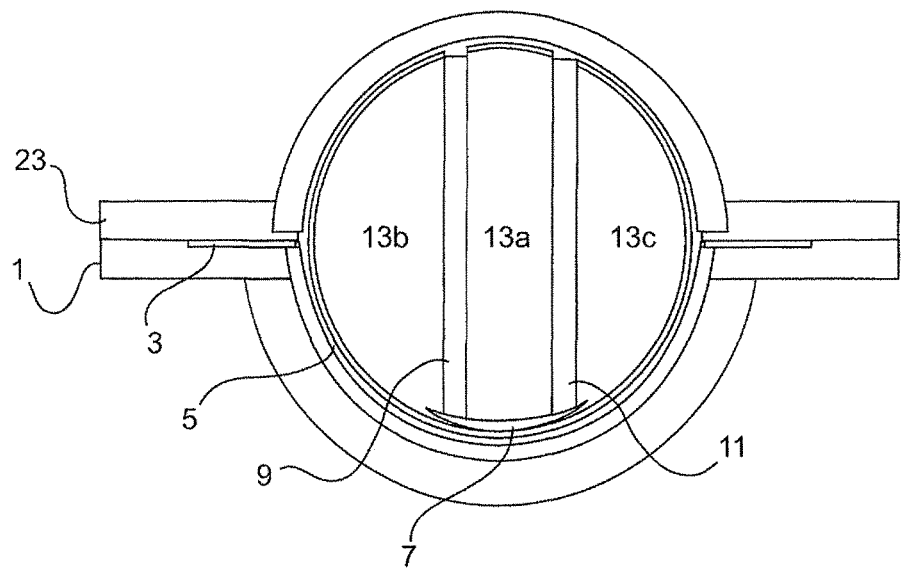

FIG. 5 shows a further subsequent production condition. The hollow bodies 13*a, b, c* are completely filled with loose material. In addition, prior to complete filling, a second mold portion 23 has been placed on the first mold portion 1. Placement of the second mold portion 23 on the first mold portion 1 in flush relationship optionally causes slight compression of the hollow bodies 13*a, b, c* to assist with optimum adaptation thereof. In the illustrated condition the hollow bodies 13*a*, *b*, *c* can be acted upon with reduced pressure. That gives rise to solidification which however does not lead to a reduction in volume or a change in shape of the hollow bodies themselves. Stability in respect of shape is ensured by the loose material particles which withstand the ambient pressure.

Figure 6:
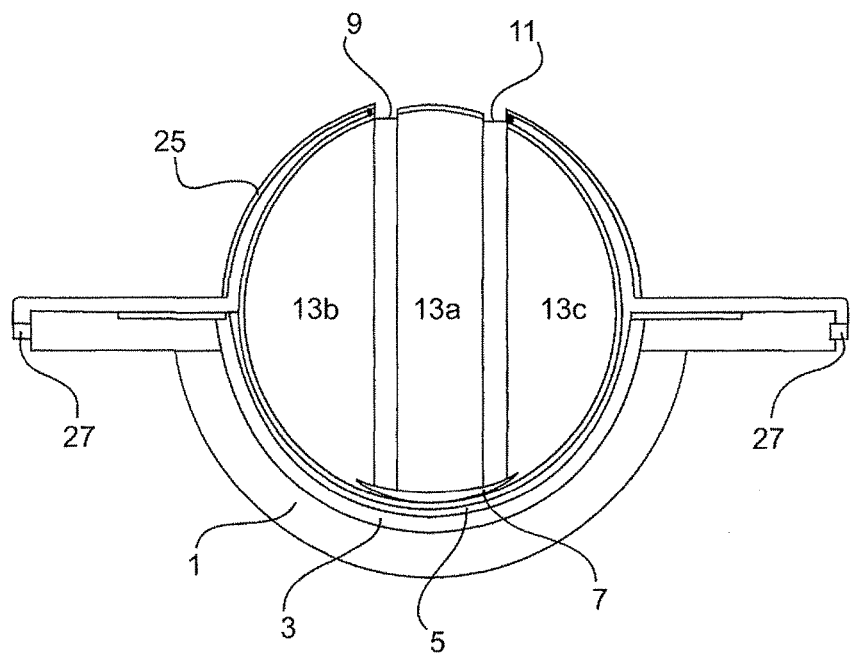

Subsequently to evacuation of the hollow bodies, whereby the mold core—in this embodiment being multi-part—is produced, the second mold portion is lifted off and in the meantime put aside. The positions of the hollow bodies 13*a*, *b*, *c*, the legs 9, 11 and the film layers between the hollow bodies (or the mold core) and the first mold portion 1 are fixed relative to each other by a procedure whereby, as shown in FIG. 6, a further vacuum film 25 is placed externally on the hollow bodies 13 *b*, *c* and the open side of the mold portion 1, sealed by means of a seal 27, and then evacuated. That ensures that all components illustrated in FIG. 6 remain in position relative to the mold portion 1, even when it is lifted off and turned over.

Figure 7:
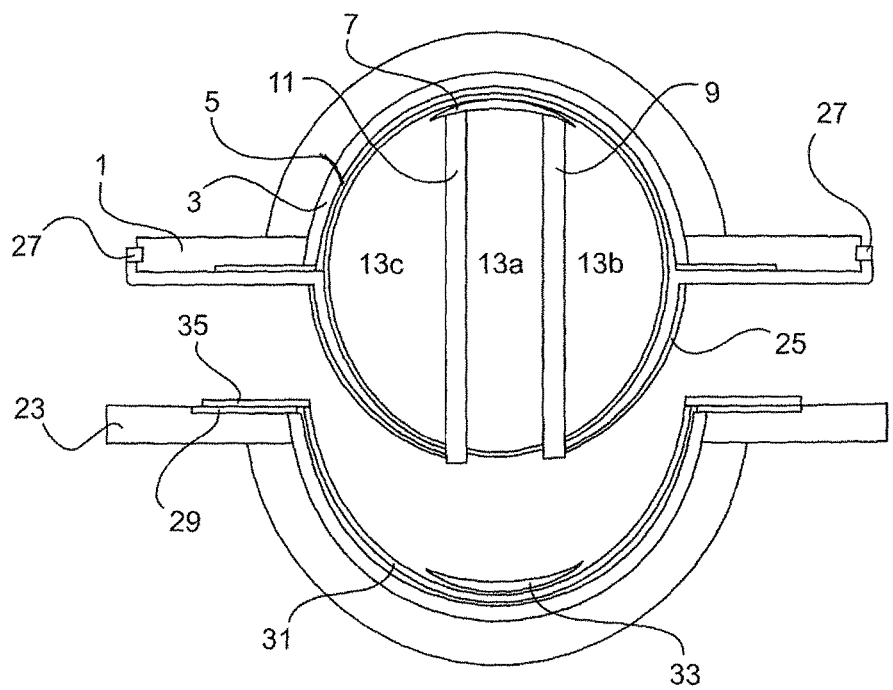
Figure 8:
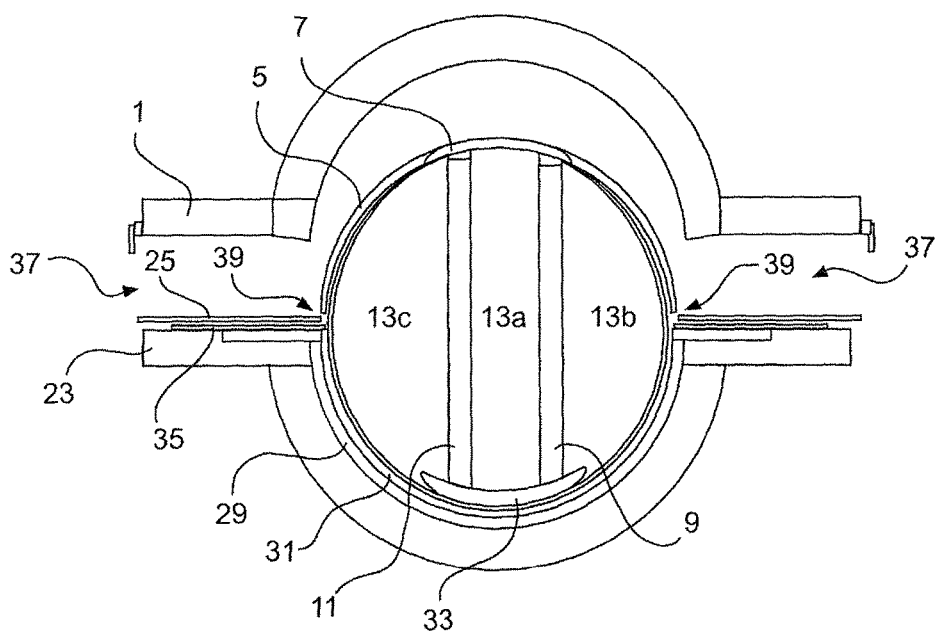

In parallel with the first mold portion 1, a second mold portion 23 is covered in the same way as the first mold portion. FIG. 7 shows such a second mold portion 23 which has a transfer film 29, a fiber material layer 31, a spar cap 33 and additionally a joint or splice portion 35. The joint or splice portion 35 also comprises fiber material. The joint portion 35 can be applied in the form of a separate layer fabric. It is particularly preferable however if the joint portion 35 is an integral constituent part of the fiber layer 31. That minimizes the interruptions in the fiber fabric, which seems advantageous in regard to the strength of the component to be produced.

FIG. 7 also shows the next production step in which the two mold portions 1,23 and the mold core are assembled with the filled, solidified hollow bodies 13*a*, *b*, *c*. For that purpose, in a first alternative, the arrangement fixed by means of the vacuum film 25 and consisting of the first mold portion 1 and the mold core is reversed and lowered from above on to the second mold portion 23 which in the meantime has been covered. In a second alternative it is not the arrangement of the first mold portion 1 and the mold core that is fixed with vacuum film and reversed, but the covered second mold portion is fixed with vacuum film, reversed and lowered on to the arrangement consisting of the first mold portion 1 and the mold core. In that case application of the covering of the second mold portion is effected either in conjunction with the second mold portion 23 or separately from the second mold portion 23 as a fabric assembly. In that case the second mold portion, after application of the fabric assembly to the arrangement consisting of the first mold portion 1 and the mold core, the second mold portion is placed as the last item on the arrangement together with the fabric assembly.

Optionally, in the second alternative, the arrangement consisting of the first mold portion 1 and the mold core is also fixed by means of vacuum film.

After assembly of the first and second mold portions 1, 23 the vacuum film 25 is cut open in a first severing region 37, which permits removal from the mold as a consequence of air flowing in between the first mold portion 1 and the rest of the arrangement.

Figure 9:
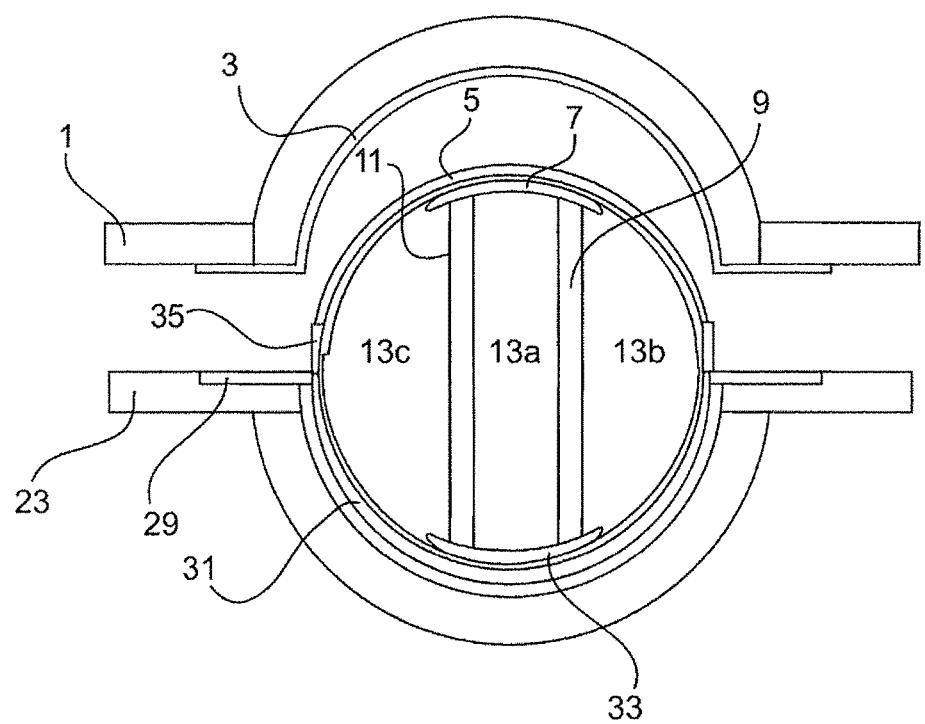

Next the outwardly projecting part of the vacuum film 25 is removed, by the vacuum film being severed in a second severing region 39 as close as possible to the fiber material layers and thus as close as possible to the designated shape of the rotor blade. In a next step shown in FIG. 9 the join portion 35 which is now freely accessible is applied upwardly where it bears snugly against the fiber layers. That affords a transition which is as bend-free as possible and continuous between the fiber layers of both blade halves. Subsequently the first mold half or the first mold portion 1 which in the meantime was again covered with transfer film 3 is placed on the second mold portion 23. Alternatively the transfer film can also be placed on the arrangement after application of the join portion 35 before the first mold portion 1 is set down in place. After the mold portions 1, 23 are sealed off relative to each other, reduced pressure is produced in per se known manner in the volume between mold core and mold portions and resin is injected in a vacuum injection process. The fluid lines and connections required for that are not shown for the sake of a compact view in the drawing.

Figure 10:
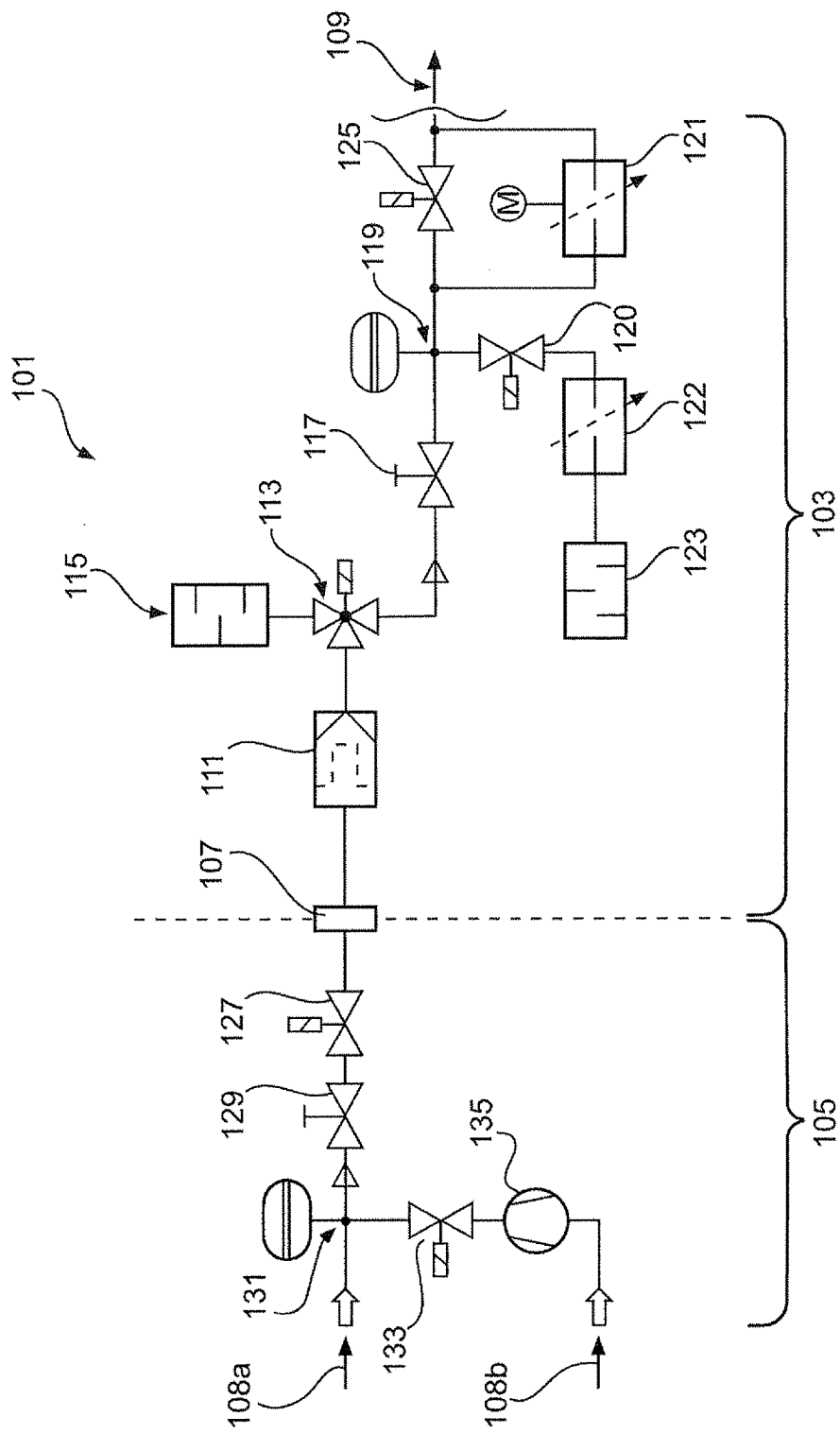
FIG. 10 shows a diagrammatic view of an apparatus for producing vacuum, in particular for use in a process according to one embodiment of the invention for producing reduced pressure.

FIG. 10 shows a device 101 for producing a reduced pressure. The device 101 has a regulating unit 103. The regulating unit 103 is adapted by means of a coupling 107 to a fitment unit 105 for connection to corresponding connections which are associated with the assembly consisting of mold core, mold portions, fiber material and film material. Various fitments are arranged within the regulating station, on a fluid line. The fluid line has a filter 111 which is adapted to clean the gas which is discharged from the mold or let into the mold. Provided subsequently to the filter 111 is a three-way valve 113 connected to a sound damper 115 towards a vent side. The three-way valve 113 is adapted to ventilate the fluid line and make it pressure-less if the coupling 107 is to be opened. In addition a shut-off fitment 117 is provided in the fluid line. The pressure in the fluid line is taken off at a connecting location 119, within the regulating station. A branch extending from a branching location 119 has one or more control valves 120, 122 and preferably a sound damper 123. The fitments 120, 122 serve primarily to increase the pressure in the fluid line by means of ventilation in the post-regulation mode of operation. The fitment 122 is a solenoid valve which is opened when the pressure falls below a predetermined reduced pressure—that is to say with an excessively reduced pressure.

As shown at the right in FIG. 10 beside the branching location 119 there is a bypass. Arranged in the bypass is a fitment, for example a ball valve, with an electric control drive. The bypass serves to vent and/or ventilate the fluid line in an accelerated process by means of the valve 125 in order either to go from ambient pressure quickly to the pressure reference value or from the pressure reference value or the applied reduced pressure in the fluid line quickly to ambient pressure. That is effected by bridging over a preferably electric control valve 121, preferably in the form of a solenoid valve, which is used primarily and preferably for post-regulation purposes. If the pressure in the fluid line is to be further lowered in the post-regulation process, the valve 121 is opened by means of the electronic control device to open the connection to the vacuum pump.

The vacuum pump or vacuum source is not shown but is only indicated by arrow 109.

Shown on the side of the regulating station 103, that is in opposite relationship to the vacuum production means, are for example some fitments as constituent parts of the fitment unit 105. Thus there is provided a solenoid valve 127 and a shut-off valve 129 in the fluid line at the mold side. The fluid pressure which is applied in the fluid line and in the space between the mold core and the mold portions is tapped off at a branching location 131. FIG. 10 further shows a branch line which is coupled to the branching location 131 and by means of which a reserve vacuum pump, as indicated by arrow 108*b*, is connected. The reserve vacuum pump is adapted to maintain the applied vacuum in the system in the uncoupled condition of the primary vacuum pump 109.

Arrow 108a indicates a connection to the space between the mold core and the mold portions.

Instead of the fluid line being continuously supplied by a vacuum pump it is optionally provided that a second fluid line is connected by means of a further branch line, and the second fluid line if required can be connected to the first fluid line. In accordance with this option, a reduced pressure is also produced and maintained in the second fluid line. In the situation where the pressure rises in the first fluid line as a result of leaks or ventilation, the loss in pressure can be compensated by connection to the second line without the vacuum pump having to be set in operation again for that purpose. That leads to considerable increases in efficiency. The second fluid line is preferably of identical structural configuration to the first fluid line. It will be noted however that the bypass provided in the first fluid line can be omitted. It is also possible to dispense with a control member for ventilation purposes (see the elements 20 in FIG. 10), in the second fluid line. In regard to the structural configuration attention is directed in that respect to the view in FIG. 10 which is identical in that aspect.

The invention claimed is:

1. A process comprising:
    manufacturing a mold core for a one-part production of wind power installation rotor blades, wherein manufacturing includes:
        partially filling a flexible hollow body with loose material;
        after partially filling the flexible hollow body with loose material, inserting the flexible hollow body between at least two mold portions that are arranged relative to each other thereby forming a negative shape of the rotor blade to be produced;
        producing a short-term increased pressure in the hollow body after the hollow body is filled with loose material and inserted between the two mold portions, wherein the increased pressure results in a space without loose material being formed in the hollow body;
        filling the space in the hollow body with loose material; and
        reducing a pressure in the hollow body so that the hollow body solidifies.

2. The process according to claim 1 further comprising filling a remaining portion of the hollow body after inserting the flexible hollow body and prior to producing the short-term increased pressure.

3. The process according to claim 1, including the step:
    inclining the hollow body inserted between the two mold portions to an angled position relative to horizontal.

4. The process according to claim 3, wherein the angled position has an angle in a range of 5° to 60°.

5. The process according to claim 1 wherein manufacturing the mold core comprises manufacturing a multi-part mold core, wherein:
    partially filling the flexible hollow body comprises partially filling each of the flexible hollow bodies with loose material;
    after partially filling each of the flexible hollow bodies with loose material, inserting the respective flexible hollow body between the at least two mold portions that are arranged relative to each other to form the negative shape;
    completely filling the respective hollow body with loose material; and
    producing the reduced pressure in the respective flexible hollow body after it has been filled and inserted, wherein all of the flexible hollow bodies solidify together in a positive shape corresponding to the negative shape.

6. The process according to claim 5 wherein for each of the parts of the multi-part core at least one of the following steps are performed for each of the parts:
    producing a short-term increased pressure in the respective hollow bodies filled with loose material and inserted between the two mold portions;
    filling loose material again after the step of producing increased pressure; and
    inclining the hollow body at an angled position relative to a horizontal.

7. The process according to claim 6, wherein the respective hollow body is filled between 20% to 70% with loose material prior to the insertion step.

8. The process according to claim 6, wherein the angled position has an angle in a range of 5° to 60°.

9. The process according to claim 5 wherein one or more legs extending between the two mold portions and supporting the two mold portions relative to each other are provided.

10. The process according to claim 1 wherein the loose material are spherical or polyhedral particles.

11. The process according to claim 10 wherein a mean diameter of the spherical or polyhedral particles is less than or equal to 20 mm.

12. A process for a one-piece production of a wind power installation rotor blade, the process including the steps:
    producing a core by the process according to claim 1,
    providing at least a first mold portion and a second mold portion that together form a negative shape of the rotor blade;
    covering the mold core or the first and second mold portions with one or more fiber material layers;
    assembling the first and second mold portions and the mold core;
    pressure-tightly closing the assembly of the mold core and first and second mold portions;
    producing a reduced pressure between the first and second mold portions and the mold core;
    injecting injection material between the first and second mold portions and the mold core under a reduced pressure; and
    hardening the injection material after the injection material has impregnated the one or more fiber material layers in the first or second mold portions.

13. The process according to claim 12 including the step:
    covering the mold core or the first and second mold portions with at least one of the following:
        a transfer film forming an outermost layer;
        a vacuum film forming an innermost layer;
        one or more first fluid lines for subjecting the volume between the mold core and the first and second mold portions to reduced pressure;
        one or more second fluid lines for feeding injection material into a volume between the mold core and the first and second mold portions with reduced pressure;
        one or more spar caps; and
        one or more further mold portions forming a leg or a pressure balancing chamber, wherein all of the mold portion and the spar caps are respectively impregnated with injection material or are impregnated during the step of feeding injection material between the mold portions and the mold core under a reduced pressure.

14. The process according to claim 13 wherein
at least the first mold portion is covered;
the mold core is fitted into the first mold portion;
the mold core and the first mold portion are fixed relative to each other by a vacuum film; and
the mold core and the first mold portion are assembled in the fixed condition to the second mold portion when the second mold portion has been covered and when the covering of the second mold portion has been applied to the arrangement of the first mold portion and the mold core.

15. The process of claim 12 wherein a part of the loose material is removed from the mold core after injecting the injection material.

16. The process of claim 12 wherein connections for one or more fluid lines and for injecting the injection material are placed so that a reduced pressure produced by the fluid lines in a space between the first and second mold portions and the mold core and causes the injection material to impregnate a leg supporting the first and second mold portions relative to each other.

17. The process of claim 12 wherein producing the reduced pressure between the first and second mold portions and mold core including the steps:
setting a pressure reference value using an operating unit of an electronic control unit that is a programmable logic controller; setting a reference time for which the pressure reference value is to be maintained;
communicating the pressure reference value and the reference time to the electronic control unit;
detecting a pressure value in a fluid line in fluid communication with a space between the first and second mold portions and mold core; using at least one pressure sensor;
communicating the pressure value to the electronic control unit;
ascertaining a difference between the pressure reference value and the pressure value by the electronic control unit;
venting the fluid line until the difference is equal to zero whereby a reduced pressure is applied;
maintaining the reduced pressure during the duration of the set reference time or until an automatic or manually implemented termination; and
ventilating the fluid line until ambient pressure is obtained.

18. The process of claim 17 wherein during reference time after the pressure reference value has been reached, the applied reduced pressure is post-regulated by the following steps:
ventilating the space between mold core and first and second mold portion when the difference ascertained by the electronic control unit is greater than zero, and
venting the space between mold core and first and second mold portion when the difference ascertained by the electronic control unit is less than zero.

19. The process of claim 18 wherein for post-regulation of the applied reduced pressure in the fluid line air is conveyed through a first valve, configured to be opened and closed by the electronic control device in dependence on the difference.

20. The process of claim 18 wherein at least one of accelerated venting and accelerated ventilation of the fluid line air is conveyed through a bypass, wherein the bypass can be opened and closed by a second valve actuated by the electronic control device.

21. The process of claim 17 including the step:
protocolling of the pressure values ascertained by the at least one pressure sensor during the duration of the set reference time.

22. The process of claim 21 including the steps:
terminating the reduced pressure implementation and ventilation of the fluid line to ambient pressure as soon as the protocolled pressure values differ from the pressure reference value by more than a preset tolerance value;
terminating the reduced pressure implementation and ventilation of the fluid line to ambient pressure as soon as the protocolled pressure values increase at a rise rate higher than a preset maximum rise rate; and
producing a pressure variation diagram for the duration of the set reference time or the duration of reduced pressure implementation until termination thereof.

* * * * *